United States Patent
Yang et al.

(10) Patent No.: US 10,037,716 B2
(45) Date of Patent: Jul. 31, 2018

(54) ENDOTRACHEAL INTUBATION TRAINING DEVICE FOR MEDICAL EMERGENCY TRAINING

(71) Applicant: BT Inc., Goyang-si (KR)

(72) Inventors: Seung Jin Yang, Goyang-si (KR); In Bae Chang, Seoul (KR); Dae Yong Kim, Goyang-si (KR)

(73) Assignee: BT Inc., Goyang-si (KR)

( * ) Notice: Subject to any disclaimer, the term of this patent is extended or adjusted under 35 U.S.C. 154(b) by 202 days.

(21) Appl. No.: 15/166,672

(22) Filed: May 27, 2016

(65) Prior Publication Data

US 2017/0345340 A1 Nov. 30, 2017

(51) Int. Cl.
*G09B 23/28* (2006.01)
*G09B 23/32* (2006.01)

(52) U.S. Cl.
CPC .................................. *G09B 23/32* (2013.01)

(58) Field of Classification Search
USPC ................ 434/262, 263, 265, 267, 272, 270
See application file for complete search history.

(56) References Cited

U.S. PATENT DOCUMENTS

| | | | | |
|---|---|---|---|---|
| 4,484,896 A * | 11/1984 | Kohnke | ............... | G09B 23/285 434/265 |
| 5,823,787 A * | 10/1998 | Gonzalez | ............... | G09B 23/28 434/265 |
| 5,846,087 A * | 12/1998 | Scherer | ............... | G09B 23/285 434/267 |
| 9,761,154 B2 * | 9/2017 | Williams | ............. | G09B 23/288 |
| 2005/0244801 A1 * | 11/2005 | DeSalvo | ............... | A61B 1/267 434/262 |
| 2011/0010155 A1 | 1/2011 | Takanishi et al. | | |
| 2012/0077169 A1 * | 3/2012 | Takeda | ................. | G09B 23/288 434/267 |
| 2012/0202180 A1 * | 8/2012 | Stock | ..................... | G09B 23/28 434/272 |
| 2013/0216992 A1 * | 8/2013 | Simeoni | ............... | G09B 23/285 434/265 |
| 2016/0140879 A1 * | 5/2016 | Hananel | ................. | G09B 23/32 434/270 |

FOREIGN PATENT DOCUMENTS

| | | |
|---|---|---|
| CN | 104376771 A | 2/2015 |
| JP | 2006-39311 A | 2/2006 |

* cited by examiner

*Primary Examiner* — Kurt Fernstrom
(74) *Attorney, Agent, or Firm* — NSIP Law

(57) ABSTRACT

An endotracheal intubation training device includes a head portion comprising an open mouth, a jaw located below the mouth, a tongue inside the mouth, and an elastic member disposed below the tongue; an airway portion comprising a trachea extending from the head and communicating with the mouth, and a glottis positioned inside the trachea; and a glottis narrowing portion disposed to surround the airway portion and configured to control a size of the glottis.

3 Claims, 6 Drawing Sheets

ENDOTRACHEAL INTUBATION TRAINING DEVICE FOR MEDICAL EMERGENCY TRAINING

BACKGROUND

1. Field

The following description relates to an endotracheal intubation training device for medical emergency training, and more particularly, to an endotracheal intubation training device that can simulates a glottic obstruction and tongue edema.

2. Description of Related Art

Endotracheal intubation is a medical procedure in which a tube is inserted into the patient's windpipe through the mouth or nose, and it is considered one of the most reliable methods for maintaining an open airway, as well as one of the most important emergency cardiopulmonary resuscitation procedures, which is commonly performed on patients in cardiopulmonary arrest. Endotracheal intubation may be required in some cases including: 1) where a secondary upper airway obstruction, apnea, or respiratory failure occurs due to an edema, facial trauma, tumor, or bleeding; 2) where mechanical ventilation is needed; or 3) when general anesthesia is administered. Endotracheal intubation is usually performed in emergency conditions, and hence its timely and adequate administration is critical to a patient's survival and long-term recovery.

The patient's life may depend on the practitioner's skill to safely and competently perform endotracheal intubation. Endotracheal intubation is a technique that requires both the knowledge and skills, and as such the practitioners have to repeatedly practice the skills for a long period of time until he/she becomes proficient. Thus, the practice of endotracheal intubation should be performed through continuous training, regular exercise, and practical training process, individualized based on practitioner's ability. However, in reality, there are difficulties in repeatedly practicing the endotracheal intubation on live humans. When the practice is performed on a conscious participant, it may be difficult to insert the training equipment into oral cavity due to reflex responses, such as a gag reflex, and risks (e.g., injury to the participant's teeth) may occur during a direct laryngoscopy.

Accordingly, anatomical human body models are used for practice and training in endotracheal intubation. In order to gain training experience that is as authentic as possible, inexperienced emergency medical workers and students for whom training is compulsory have been using such human body models to imagine actual emergency patients. Education that utilizes the human body models may provide an opportunity to the trainees to apply theoretical knowledge, prevent medical malpractice which may cause injuries to a participant, and improve the trainees' problem-solving abilities and confidence.

The endotracheal intubation is performed through the following steps: The head tilt-chin lift maneuver or, in the case of a trauma patient, the chin thrust maneuver is performed to maintain an airway. An oropharyngeal airway is inserted into the patient's oral cavity to lift the tongue, and bag-valve-mask ventilation is performed. When a laryngoscope, an endotracheal tube, and other devices are prepared, the oropharyngeal airway is removed, and then the lower jaw is lifted to bring the vocal cords into view by using the laryngoscope. Then, the endotracheal tube is slid in passed the vocal cords until the cuff of said tube reaches the area above the carina; then said tube is connected to the bag-valve mask to deliver ventilation to the patient. Finally, the position of the tube is confirmed with a stethoscope upon auscultation of equal bilateral breathing sounds.

Inserting the endotracheal tube using the laryngoscope is a key procedure, which is directly linked to the success in endotracheal intubation. However, in the case of a patient whose airway cannot be secured (i.e., the glottis cannot be sufficiently viewed), insertion of the endotracheal tube by use of the laryngoscope is difficult, and if this situation is not resolved, the patient may develop brain damage or even die. So, being able to assess such a difficult airway management situation in a timely manner, as well as expertly performing the endotracheal intubation entails the practitioner repeatedly practicing for a long period of time until he/she becomes proficient.

In the currently commercialized human body models for endotracheal intubation, a difficult airway management situation is recreated by inserting air into the areas around the glottis and the tongue by use of a manual air pump to thereby narrow the glottis or inflate the tongue. However, this method requires continuous manual operation of the air pump because air leaks out easily.

Hence, the present disclosure suggests an endotracheal intubation training device that includes an airway portion that simulates a glottic obstruction and tongue edema, which are difficult airway management situations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to an endotracheal intubation training device which allows a trainee to gain a training experience that is as authentic as possible to a real situation, thereby increasing the effects of the training.

In one general aspect, there is provided an endotracheal intubation training device including: a head portion comprising an open mouth, a jaw located below the mouth, a tongue inside the mouth, and an elastic member disposed below the tongue; an airway portion comprising a trachea extending from the head and communicating with the mouth, and a glottis positioned inside the trachea; and a glottis narrowing portion juxtaposed to the airway portion and capable of controlling a size of the glottis.

The glottis narrowing portion may include a rope which surrounds the airway portion and is configured to pressurize the airway portion while being wrapped around the airway, and a winder which is disposed on the airway and is configured to adjust an amount of winding of the rope to control the size of the glottis.

The endotracheal intubation training device may further include a glottis shaping plate which is interposed between the glottis narrowing portion and the airway portion and is configured to control a shape of the glottis while the glottis narrowing portion is controlling the size of the glottis.

In another general aspect, there is provided an endotracheal intubation training device including: a head portion comprising an open mouth, a jaw located below the mouth, a tongue inside the mouth, and an elastic member disposed below the tongue; and a tongue height controller configured to control a height of the tongue from the jaw by pressurizing or releasing the elastic member.

The tongue height controller may include: a winder which is disposed on one area of the jaw and is configured to control an amount of winding of a rope; the rope which is withdrawn from the winder and has both ends fixed onto another area of the jaw; and a rope support which is disposed below the elastic member, is coupled to the rope and is configured to pressurize and release the elastic member according to the amount of winding of the rope.

Other features and aspects will be apparent from the following detailed description, the drawings, and the claims.

Figure 1:
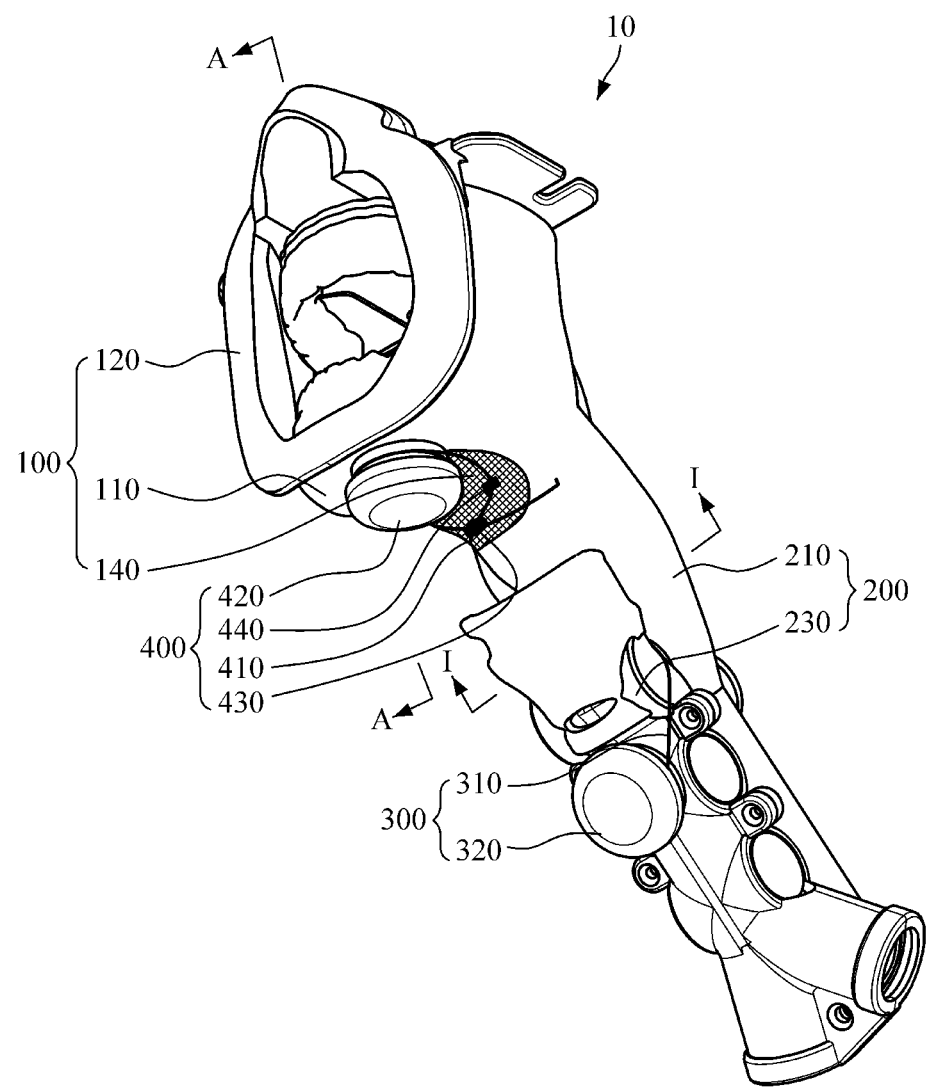
FIG. 1 is a perspective view of an endotracheal intubation training device 10 according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Hereinafter, an endotracheal intubation training device will be described with reference to the accompanying drawings.

Figure 2:
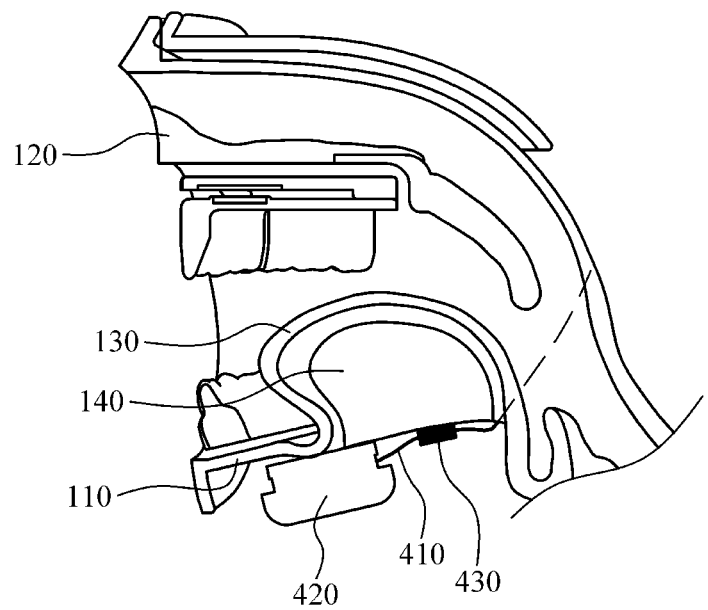
FIG. 2 is a cross-sectional view taken along the line A-A of the endotracheal intubation training device shown in FIG. 1.

FIG. 1 is a diagram illustrating a perspective view of an endotracheal intubation training device 10 according to an exemplary embodiment, and FIG. 2 is a diagram illustrating a cross-sectional view taken along the line A-A of the endotracheal intubation training device shown in FIG. 1.

Referring to FIGS. 1 and 2, the endotracheal intubation training device 10 (hereinafter, will be referred to as a "training device 10") includes a head portion 100 which is modeled after a human oral cavity, an airway portion 200 extending from the head portion 100, a glottis narrowing portion 300 connected to the airway portion 200, and a tongue height controller 400.

The head portion 100 is modelled after a portion of a human body, including an open mouth 120, a jaw 110 below the mouth 120, a tongue 130 positioned inside the mouth 120, and an elastic member 140 below the tongue 130.

The elastic member 140 is made of any material that easily contracts or expands in one direction, and it is disposed in a space formed beneath the tongue 130 in the head portion 100.

In addition, the training device 10 may further include a neck portion (not shown) that extends from the head portion 100. The neck portion may be connected to the head portion 100 via a hinge so that the head portion 100 can tilt forward and backward. By doing so, a training device can be implemented which allows a user to gain an experience that is as authentic as possible to a real situation where a head tilt-jaw lift maneuver is performed on a real patient before endotracheal intubation.

The airway portion 200 may extend from the head portion 100, including a trachea 210 in communication with the mouth 120, and a glottis 220 positioned inside the trachea 210. Further, the airway portion 200 may be connected to the neck portion and extend from the head portion 100.

The airway portion 200 may further include a laryngeal cartilage model 230 that is modeled after laryngeal cartilages, which are structures in the body that encircle the glottis.

Figure 3:
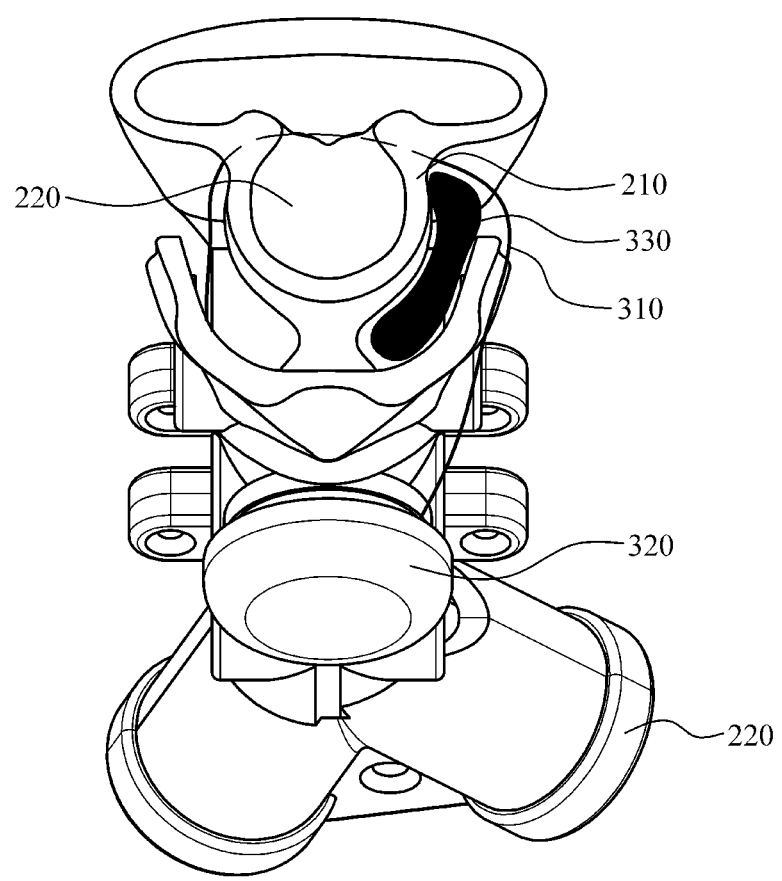
FIG. 3 is a cross-sectional view taken along the line I-I of the training device shown in FIG. 1.

FIG. 3 is a diagram illustrating a cross-sectional view taken along the line I-I of the training device shown in FIG. 1.

Referring to FIG. 3, the glottis narrowing portion 300 is juxtaposed to the trachea 210 and controls the size of the glottis 220 by pressurizing or releasing the trachea 210.

The glottis narrowing portion 300 includes a rope 310 and a winder 320.

The rope 310 may surround the airway portion 200 and pressurize the airway portion 200 upon tightening the winder 320.

According to the exemplary embodiment, one end of the rope 310 is coupled to the winder 320, which will be elaborated later, and the other end is securely coupled to the laryngeal cartilage model 230 and surrounds both the laryngeal cartilage model 230 and the trachea 210.

In another exemplary embodiment, both ends of the rope 310 are coupled to the winder 320 and surround the trachea 210. To further elaborate, the rope loops around the winder 320 and the trachea 210, thus connecting said parts.

The rope 310 may be cord of some sort made of metal or fabric including cotton, linen, or synthetic fiber. However, the rope 310 is not limited to the above description, and may include other types of materials, such as string, wire, etc., that can pressurize the airway portion 200.

The winder 320 is disposed on the airway portion 200 and adjusts the amount of winding of the rope 310 around the airway portion 200 so as to control the size of the glottis 220. According to the exemplary embodiment, the winder 320 is disposed on one side of the laryngeal cartilage model 230, and is connected to the rope 310 so that the winder 320 can adjust the amount of winding of the rope 310 by controlling the rope 310 to wrap around and unwrap from the airway portion 200, thereby controlling the size of the glottis 220. The operations of the winder 320 that controls the size of the glottis 220 will be described later.

By the movement of the winder 320, which may be operated by an external force applied in either a clockwise or counterclockwise direction, the rope 310 may be tightened or loosened. That is, the winder 320 can apply a tensile force to the rope 310. In addition, when the winder 320 is pulled upward, the rope 310 is released and unwrapped from the airway portion 200. At this time, the amount of winding of the rope 310 is minimized.

As the configuration of the winder 320 has been well-known, aspects of the present disclosure are not limited to the above description, and the winder 320 may include any means for winding or unwinding the rope 310.

Referring back to FIG. 3, the glottis narrowing portion 300 may further include a glottis shaping plate 330. The glottis shaping plate 330 may be disposed between the glottis narrowing portion 300 and the airway portion 200 so that it can control the shape of the glottis 200 when the glottis narrowing portion 300 controls the size of the glottis 220.

According to the exemplary embodiment, the glottis shaping plate 330 is interposed between the rope 310 and the trachea 210 so that a shape of the glottis 220 can be formed corresponding to the pressure of the glottis shaping plate 330.

According to the exemplary embodiment, the glottis shaping plate 330 may be interposed between the trachea 210 and the laryngeal cartilage model 230 and is in direct contact with the trachea 210. When the rope 310 is tightened as it is wound, the glottis shaping plate 330 directly pressurizes one surface of the trachea 210, thus creating a glottis 220 whose shape changes in relation to the shape of the shaping plate 330.

In another exemplary embodiment, a pair of glottis shaping plates 330 may be interposed between the trachea 210 and the laryngeal cartilage model 230, and be in direction contact with the trachea 210. In this case, when the rope 310 is tightened as it is wound, each of the glottis shaping plates 330 may directly pressurize each respective side of the trachea 210, thus creating the glottis 220 whose shape changes in relation to the shape of the glottis shaping plate 330.

The configuration of the glottis narrowing portion 300 according to the exemplary embodiment may be designed as described above, but aspects of the present disclosure are not limited thereto, such that the glottis narrowing portion 300 includes any means that can control the size of the glottis 220 by narrowing and pressurizing the airway portion 200.

Hereinafter, the operations of the glottis narrowing portion 300 according to the exemplary embodiment will be described.

Figure 4:
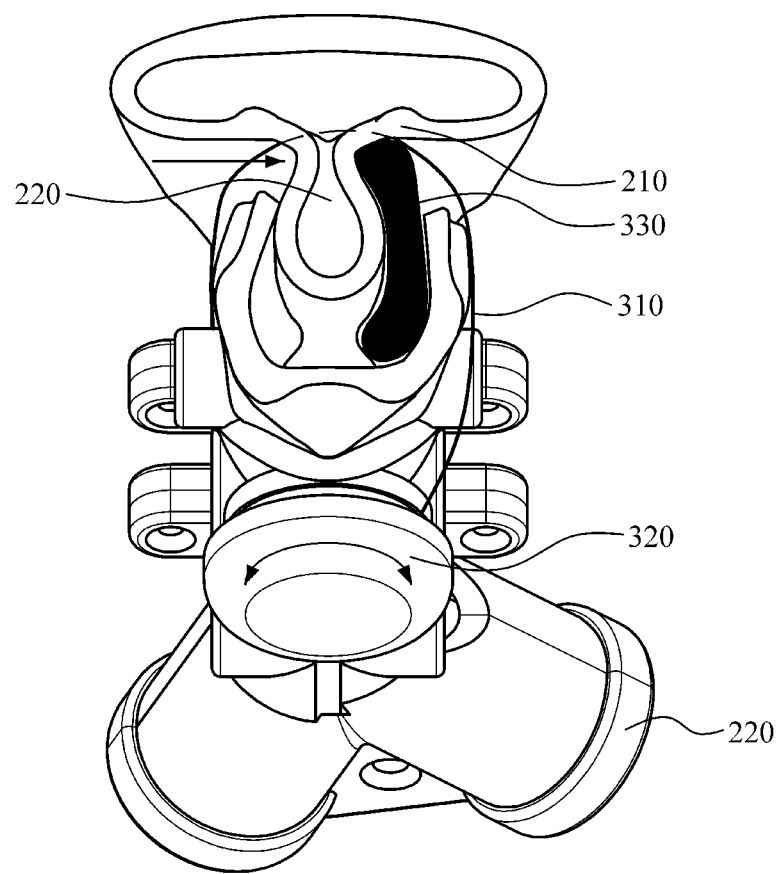
FIG. 4 is a cross-sectional view for showing the operation of the glottis narrowing portion shown in FIG. 1.

FIG. 4 is a cross-sectional view for showing the operation of the glottis narrowing portion shown in FIG. 1. Referring to FIG. 4, the operation of the glottis narrowing portion 300 is triggered by the external force delivered to the winder 320.

In one example, when an external force is applied to the winder 320 in a clockwise direction, the rope 310 attached to the winder 320 is wound around the winder 320 by the rotation of the winder 320 in the clockwise direction.

The length of the rope 310 exposed from the winder 320 becomes shorter compared to the length before the external force was applied to the rope 310, and the rope 210 consequently pressurizes the trachea 210. As the trachea 210 becomes more pressurized, the size of the glottis 220 decreases, so that it is possible to implement the trachea 210 with a closed glottis. A desired size of the glottis 220 is achieved by controlling the amount of winding of the rope 310 by use of the winder 320.

In addition, when the rope 310 pressurizes the airway portion 200, the glottis 220 is pressurized due to its direct contact with the glottis shaping plate 330, which is situated between the glottis narrowing portion 300 and the trachea 210. Hence, the shape of the glottis 220 changes in relation to the shape of the glottis shaping plate 330, which means a glottis 220 that is abnormal, such as a glottic obstruction, can be recreated.

The glottis narrowing portion 300 changes the size and shape of the glottis 220 in order to produce an abnormal glottis 220 upon which a trainee can practice endotracheal intubation.

Figure 5:
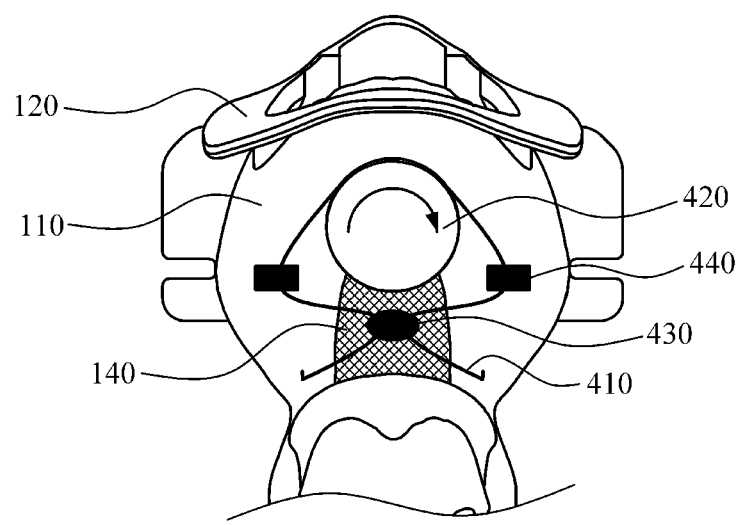
FIG. 5 is a bottom view of the endotracheal intubation training device shown in FIG. 1.

FIG. 5 is a bottom view of the endotracheal intubation training device 10 of FIG. 1.

Referring to FIG. 5, the tongue height controller 400 controls the height of the tongue 130 from the jaw 110 by pressurizing or releasing the elastic member 140.

According to the exemplary embodiment, the tongue height controller 400 includes a rope 410, a winder 420, and a rope support 430, so as to pressurize or release a lower surface of the elastic member 140.

The rope 410 is wound around the winder 420. The rope loops around the winder 320 and passes through the rope support 430; each end of the rope 410 is fixed onto each side of the bottom surface of the jaw 110.

The rope 310 may be cord of some sort made of metal or fabric including cotton, linen, or synthetic fiber. However, the rope 310 is not limited to the above description, and may include other types of materials, such as string, wire, etc.

The rope 410 may be a cord of some sort made of metal or fabric including cotton, linen, or synthetic fiber. However, the rope 410 is not limited to the above description, and may include any types of string or cord material that is strong enough to pressurize the airway portion 200.

Description of the winder 420 repeats that of winder 320, and as such a portion of the prior one will be omitted so as avoid redundancy.

The winder 420 controls the amount of winding of the rope 410 to control the amount of pressure to be applied to the elastic member 140. In the exemplary embodiment, the winder 420 is disposed on another area of the bottom surface of the jaw 110.

According to the exemplary embodiment, the winder 420 winds the rope 410 thereon to control the amount of winding of the rope 410. The winder 420 can tighten the rope 410 by increasing the amount of winding of the rope 410 and also can loosen the rope 410 by reducing the amount of winding.

The rope support 430 is disposed on the bottom surface of the head portion 100, and becomes an intermediate medium that is connected to the rope and hence can pressurize the elastic member 140.

The rope support 430 is disposed on the bottom surface of the elastic member 140, and serves as an anchor point of the tensile force of the rope that is determined according to the amount of winding of the rope 410. In this case, the elastic member 140 may be pressurized upward or released by the tensile force of the rope 410. In addition, the rope support 430 guides the rope 410 to smoothly pass through it.

The rope support 430 may be formed in a loop or tube shape that can pass the rope 410 therethrough, and the shape of the rope support 430 may also include an eyelet or ring.

In addition, the tongue height controller 400 may further include auxiliary rope supports 440. The auxiliary rope supports 440 are disposed to more effectively pressurize the elastic member 140. According to the exemplary embodiment, each of the auxiliary rope supports 440 is positioned to be at each side of the rope support 430 and the rope 410 is coupled to the auxiliary rope supports 440. In this case, the rope 410 is withdrawn from the winder 420, passing sequentially through the auxiliary rope supports 440, and the rope support 430, and is fixed on both sides of the bottom surface of the jaw 110.

The operation of the tongue height controller 400 according to the exemplary embodiment will be described.

Figure 6:
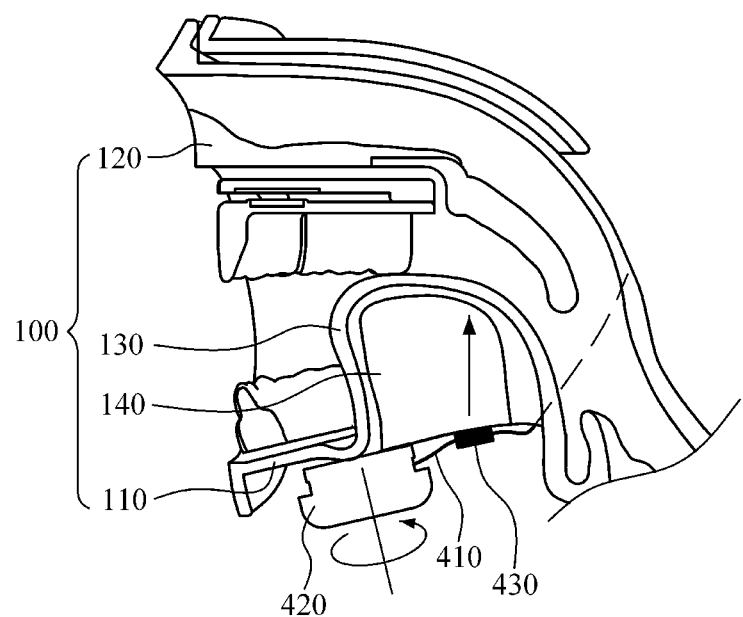
FIG. 6 is a cross-sectional view for showing the operation of the tongue height controller shown in FIG. 2.

FIG. 6 is a cross-sectional view for showing the operation of the tongue height controller 400 of FIG. 2. Referring to FIG. 6, the operation of the tongue height controller 400 is triggered by the external force delivered to the winder 420.

In one example, when an external force is applied to the winder 420 in a clockwise direction, the rope 410 is wrapped around the winder 420 by the rotation of the winder 420 in the clockwise direction. When the winder 420 is pulled upward, the rope 410 is unwrapped.

As the rope 410 is wound, the rope 410 becomes tighter, inevitably creating an attractive force between the two ends of the rope 410 and the winder 420, and furthermore, between the two sides of the bottom surface of the jaw 110 onto which the ends of the rope 410 is fixed one on each side. As a result of this tension that is created, the rope support 430 pushes upward the elastic member 140, located relatively in the center of the jaw 110, thus increasing the maximum height of the bottom surface of the elastic member 140 so that it is pushed more inward than the bottom surface of the jaw 110, which inevitably also pushes up the tongue to its maximum height since it connected to the elastic member 140.

As the rope 410 is unwrapped, the rope 410 is loosened, so that the attraction force between both ends of the rope 410 and the winder 420 is reduced. Therefore, the force imposed in an upward direction on the elastic member 140 decreases, and in turn, the heights of the elastic member 140 and the tongue 130 also decrease.

By the aforesaid operations, the height of the tongue 130 is adjusted to recreate tongue edema. Hence, the trainee can practice the endotracheal intubation on the human body model with an abnormal tongue condition.

According to the exemplary embodiments, the trainee can gain an experience that is as authentic as possible to a real situation where endotracheal intubation is performed on a patient with glottic obstruction or tongue edema.

In more detail, the endotracheal intubation training device is designed to be anatomically similar to the human body, thereby providing an environment that is conducive for endotracheal intubation practice. Said device provides training experience that is as authentic as possible to professional emergency medical care providers, such as emergency medical technicians, fire emergency medical providers, physicians, nursing administrators, etc., as well as students for whom training is compulsory, as they may use said training device to imagine an actual emergency patient in need of endotracheal intubation due to glottic obstruction or the like.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An endotracheal intubation training device, comprising:
   a head portion comprising an open mouth, a jaw located below the mouth, a tongue inside the mouth, and an elastic member disposed below the tongue;
   an airway portion comprising a trachea extending from the head and communicating with the mouth, and a glottis positioned inside the trachea; and
   a glottis narrowing portion juxtaposed to the airway portion, and configured to control a size of the glottis,
   wherein the glottis narrowing portion comprises a rope surrounding the airway portion and configured to pressurize the airway portion while being wrapped around the airway, and a winder disposed on the airway and configured to adjust an amount of winding of the rope to control the size of the glottis.

2. The endotracheal intubation training device of claim 1, further comprising:
   a glottis shaping plate interposed between the glottis narrowing portion and the airway portion, and configured to control a shape of the glottis while the glottis narrowing portion is controlling the size of the glottis.

3. An endotracheal intubation training device, comprising:
   a head portion comprising an open mouth, a jaw located below the mouth, a tongue inside the mouth, and an elastic member disposed below the tongue; and
   a tongue height controller configured to control a height of the tongue from the jaw by pressurizing or releasing the elastic member, and comprising
   a winder disposed on an area of the jaw,
   a rope which is withdrawn from the winder and has both ends fixed onto another area of the jaw, and
   a rope support disposed below the elastic member, coupled to the rope, and configured to pressurize and release the elastic member according to an amount of winding of the rope,
   wherein the winder is configured to control the amount of winding of the rope.

\* \* \* \* \*